Feb. 11, 1930.	H. O. HEM	1,746,351
TESTING DEVICE
Filed Oct. 18, 1926	2 Sheets-Sheet 1
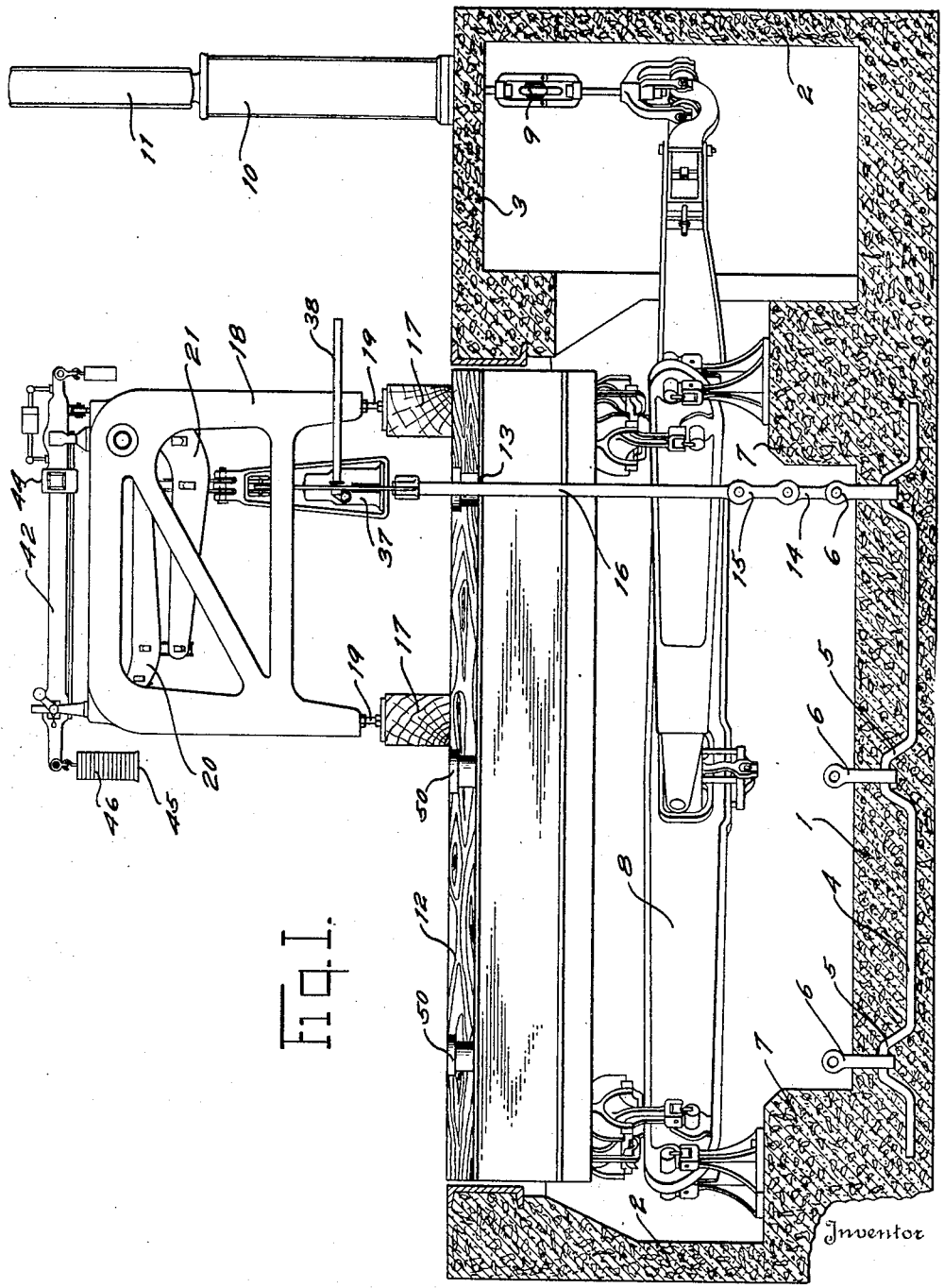
Inventor
Halvor O. Hem
By
C. O. Marshall Attorney Feb. 11, 1930.   H. O. HEM   1,746,351
TESTING DEVICE
Filed Oct. 18, 1926   2 Sheets-Sheet 2
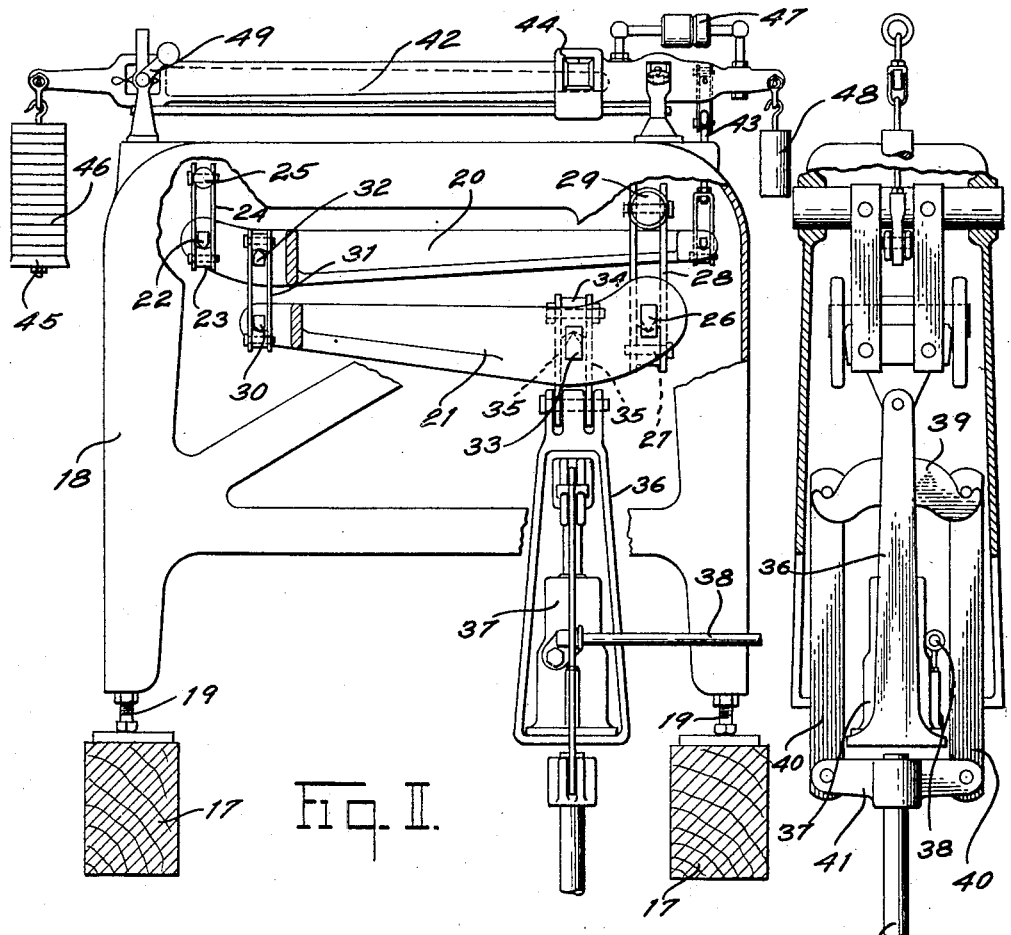
Fig. II.   Fig. III.
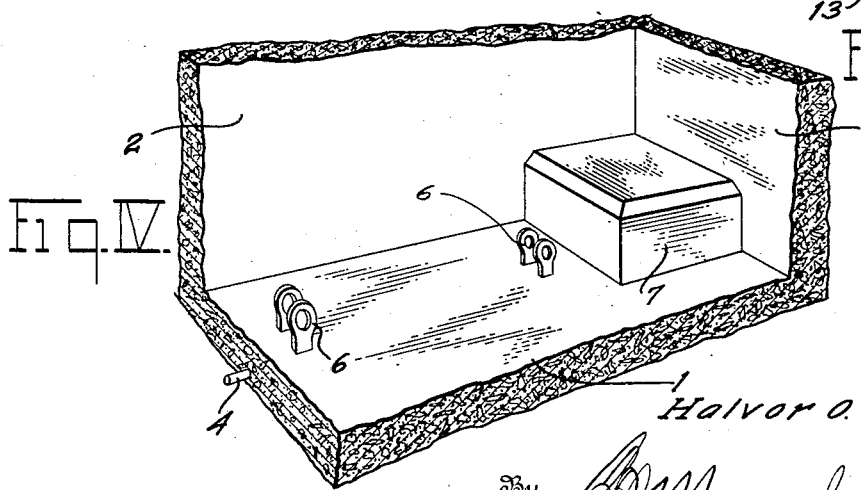
Fig. IV.
Inventor
Halvor O. Hem
By B. Marshall
Attorney Patented Feb. 11, 1930

1,746,351

UNITED STATES PATENT OFFICE

HALVOR O. HEM, OF TOLEDO, OHIO, ASSIGNOR TO TOLEDO SCALE COMPANY, OF TOLEDO, OHIO, A CORPORATION OF NEW JERSEY

TESTING DEVICE

Application filed October 18, 1926. Serial No. 142,217.

This invention relates to testing devices, and particularly to devices for testing weighing scales of relatively great capacity.

One of its principal objects is to provide a device for testing scales which obviates the necessity of transporting heavy test weights to the scale or keeping them at hand.

Another object is to provide a testing device for scales of comparatively great capacity which is easily portable.

Another object is the provision of a device of this character and means for so supporting it upon the scale as to provide a test for the scale at the corners of the platform as well as adjacent the center thereof.

Another object is to provide means to be incorporated in the scale installation for quickly and securely attaching the testing device.

Another object is the provision of a device of this character which is adapted for use on automatic scales in which the level of the platform varies slightly under different loads and which is provided with means to take care of such variations in the level of the platform or of deflection or change of position of the platform and platform levers of beam scales.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale with the pit shown in section, a portion of the scale platform being removed and the testing device of my invention being in operative connection with the scale;

Figure II is an enlarged side elevational view of the testing device of my invention, some of the connecting parts being removed and parts of the housing and lever being broken away to show the mechanism;

Figure III is a front elevational view of a part of the testing device;

Figure IV is a fragmentary perspective view showing a portion of a pit constructed with connections for the testing device.

Referring to the drawings in detail, the scale pit is constructed with a bottom 1, walls 2 and a deck 3 of concrete, and embedded in the bottom 1 is one or more rods 4 to which are connected, preferably at loops such as 5, a series of clevises 6, the clevises being so located that one of them is adjacent each corner of the scale, other clevises being located at intermediate points. Supported upon piers 7 within the pit is the platform lever mechanism 8 of the scale, which is in turn connected by means of connections 9 to the load-counterbalancing mechanism which, in the form of scale shown, is contained in a cabinet 10 and housing 11. The load-counterbalancing mechanism may be of either the automatic or beam type.

Mounted upon the platform lever mechanism 8 is a platform 12 which has an opening 13 above each of the clevises 6. In connecting my testing device a series of links 14, 15, 16 is connected to one of the clevises 6, the uppermost link 16 extending upwardly through one of the openings in the platform. My testing device is supported upon the platform, preferably with the interposition of timbers 17.

The testing device includes a frame 18 which rests upon adjustable feet 19 and may, therefore, be properly leveled. The frame is, as is shown in Figures I and II, so constructed as to partially house a pair of levers 20 and 21, the lever 20 being fulcrumed upon a pivot 22 which is supported on a bearing 23 suspended by means of links 24 from a pin 25 secured within the frame 18. The lever 21 is similarly fulcrumed on a pivot 26 supported upon a bearing 27 which is suspended by means of links 28 from a pin 29 fixed in the frame 18. The nose pivot 30 of the lever 21 is connected by means of links 31 to a load pivot 32 on the lever 20, so that any load applied to the lever 21 is transmitted to the lever 20.

Supported on the load pivot 33 of the lever 21 is a bearing 34 from which depend a pair of links 35, the lower ends of the links 35 being connected to a frame 36 which supports a hydraulic jack 37 adapted to be operated by a handle 38. Carried upon the upper end of the jack 37 is a saddle 39 from which depend links 40 and the lower ends of the links 40 are connected to a cross-head 41 secured to the upper end of the link 13. By operating the jack 37 an upward pull is created on the link 13 and the testing device is thus forced downwardly upon the platform 12. In order to counterbalance the pull on the levers 20 and 21 a beam 42 is mounted upon the frame and connected by means of links 43 to the nose of the lever 20. The lever 42 is equipped with a sliding poise 44 and a poise pan 45 adapted to carry additional counterbalance weights 46. These weights are relatively small, but the multiplication of the leverage may be such that each weight 46 having a mass of 1 lb. may exert a pressure upon the platform of 1000 lbs.

The equilibrium of the beam 42 is adjusted by means of a threaded balance weight 47 and a bottle weight 48.

The beam lock 49 is of such construction that the beam is locked in central position so that when released it immediately begins to move downwardly if the effect of the poise 44 and the counterweights 46 is too great to counterbalance the pull of the scale. In other words, if the scale is fast, the beam will move downwardly; if the scale is slow, the beam will move upwardly.

In testing a beam scale the scale poise may be set to counterbalance a certain load, the testing device locked by means of the lock 49 and the jack 37 operated until the beam of the scale is in balance. The lock 49 may then be unlocked. If the scale is slow the beam 42 will rise and the poise 44 may be moved outwardly until the beam 42 is in balance. The movement required of the poise 44 will indicate the amount that the scale is slow. This operation may be repeated for as many different loads as is required, or the beam 42 may be left unlocked, the jack 37 operated until the beam 42 is in balance and the scale poise then moved outwardly until the scale beam is in balance. If the scale be in proper condition the indications on the beam 42 and the scale beam will be the same. If the scale be slow or fast its condition will be indicated by the position of its poise on its beam.

In testing an automatic scale the beam 42 may be locked and the jack 37 operated until the indicator shows a definite weight, such as 1000, 2000 or 3000 lbs. The poise pan 45 may be then loaded correspondingly and the beam 42 unlocked. If the scale be in proper condition the beam 42 will balance in the center of its trig loop. If the scale be fast the beam will descend, and if the scale be slow the beam will rise, or the poise pan 45 may be loaded to the desired point and the jack 37 operated until the beam 42 is in balance. The indicator of the scale will then show whether the scale is fast or slow. If in any case it is found impossible to bring the beam 42 to balance by means of the jack 37, the leveling screws 19 may be adjusted slightly to obtain the desired effect.

Closures 50 of metal or other material may be provided for the openings 13.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a scale foundation, and means for attaching a testing device anchored therein, said means comprising a plurality of connections in the bottom of said foundation located beneath various parts of the scale platform.

2. In a device of the class described, in combination, a scale foundation, and connecting means for a testing device anchored therein, said connecting means including a connection beneath the portion of the platform adjacent each corner thereof.

3. In a device of the class described, in combination, a scale foundation, connecting means for a testing device anchored therein, said connecting means including a connection beneath the portion of the platform adjacent each corner thereof, and a connection intermediate the first-mentioned connections.

4. In a device of the class described, in combination, a scale foundation having means for connecting a testing device anchored therein, platform lever mechanism on said foundation, and a platform on said platform lever mechanism, said platform having openings for the passage of a link leading from said connecting means.

5. In a device of the class described, in combination, a scale foundation, means for connecting a testing device anchored thereto, platform lever mechanism on said foundation, a platform mounted on said platform lever mechanism, a testing device supported on said platform, said platform having an opening therein, and means extending through said opening and connecting said testing device to said anchored connecting means.

6. In a device of the class described, in combination, a testing device adapted to be supported upon a scale platform, and means for connecting said testing device to an anchorage, said means including a jack.

7. In a device of the class described, in combination, a testing device adapted to be supported upon a scale platform, and means for connecting said testing device to an anchorage, said means including a hydraulic jack.

8. In a device of the class described, in combination, a testing device adapted to be supported upon a scale platform, and means for connecting said testing device to an anchorage, said means including a frame suspended from said testing device and a jack supported on said frame.

9. In a device of the class described, in combination, a frame, lever mechanism mounted in said frame, a jack supported by said lever mechanism, and a beam mounted upon said frame and connected to said lever mechanism.

10. In a device of the class described, in combination, a foundation, platform lever mechanism supported on said foundation, a platform supported on said platform lever mechanism, said platform having a plurality of openings, and a plurality of connections for a testing device anchored in said foundation and located respectively beneath said openings.

HALVOR O. HEM.